(12) United States Patent
Dalena et al.

(10) Patent No.: US 10,177,659 B2
(45) Date of Patent: Jan. 8, 2019

(54) NULLING REVERSE RECOVERY CHARGE IN DC/DC POWER CONVERTERS

(71) Applicant: Dialog Semiconductor (UK) Limited, London (GB)

(72) Inventors: Francesco Dalena, Leghorn (IT); Nicolo Nizza, Marsala (IT); Danilo Gerna, Cortaillod (CH); Enrico Pardi, Cascina (IT); Stefano Scaldaferri, Bientina (IT); Alexandre Morello, Leghorn (IT); Tommaso Baldetti, Pisa (IT)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/356,894

(22) Filed: Nov. 21, 2016

(65) Prior Publication Data

US 2018/0026538 A1    Jan. 25, 2018

(30) Foreign Application Priority Data

Jul. 19, 2016  (DE) ........................ 10 2016 213 190

(51) Int. Cl.
| | |
|---|---|
| *H02M 3/158* | (2006.01) |
| *H02M 3/156* | (2006.01) |
| *H02M 7/48* | (2007.01) |
| *H02M 1/38* | (2007.01) |
| *H02M 1/00* | (2006.01) |

(52) U.S. Cl.
CPC ............. *H02M 3/158* (2013.01); *H02M 1/38* (2013.01); *H02M 3/156* (2013.01); *H02M 3/1584* (2013.01); *H02M 3/1588* (2013.01); *H02M 7/48* (2013.01); *H02M 2001/0051* (2013.01)

(58) Field of Classification Search
CPC ...................................................... H02M 3/158
See application file for complete search history.

(56) References Cited

U.S. PATENT DOCUMENTS

| | | | | |
|---|---|---|---|---|
| 2009/0033299 | A1* | 2/2009 | Ishino ................. | H02M 3/1588 323/282 |
| 2011/0148377 | A1* | 6/2011 | Schiff ................. | H02M 3/1588 323/283 |
| 2016/0087543 | A1* | 3/2016 | Jin .......................... | H02M 1/38 363/21.03 |

* cited by examiner

*Primary Examiner* — Jue Zhang
*Assistant Examiner* — Trinh Q Dang
(74) *Attorney, Agent, or Firm* — Saile Ackerman LLC; Stephen B. Ackerman

(57) ABSTRACT

A switching mode power converter circuit and a method are presented. The circuit comprises a first transistor switch and a second transistor switch coupled in series between an input voltage level and ground. There is a control circuit for controlling switching operation of the first transistor switch and the second transistor switch. There is a detection circuit for sensing a voltage at an intermediate node arranged between the first transistor switch and the second transistor switch, for deriving an indication of a slope of the sensed voltage, and for generating a switching control signal for the control circuit on the basis of the derived indication of the slope of the sensed voltage. The control circuit sets a first timing for activating the first transistor switch and/or a second timing for activating the second transistor switch on the basis of the switching control signal.

22 Claims, 9 Drawing Sheets

NULLING REVERSE RECOVERY CHARGE IN DC/DC POWER CONVERTERS

TECHNICAL FIELD

This application relates to switching mode power converter circuits and methods of operating switching mode power converter circuits. The application particularly relates to such circuits and methods that improve removal of a reverse recovery charge.

BACKGROUND

Switching regulators (switching mode power converters), including ripple regulators, are commonly used because of their characteristic of high efficiency and high power density resulting from smaller magnetic, capacitive and heat sink components.

Synchronous buck power stages are a specific example of switching regulators that use two power switches such as power MOSFET devices. A high-side switch selectively couples an inductor to a positive power supply while a low-side switch selectively couples the inductor to ground. A pulse width modulation (PWM) control circuit is used to control the high-side and low-side switches. Synchronous buck regulators provide high efficiency when low ON-resistance power switches such as MOSFET devices are used.

A buck converter is an example of a commonly used switching mode power converter. A typical buck converter includes high-side and low-side power transistors (e.g., switching transistors, or transistor switches) connected between a supply voltage (input voltage) and ground, as well as an output inductor and an output filter capacitor connected in series between an intermediate node (switching node, LX node) arranged between the high-side and low-side switching transistors, and ground. The switching transistors may be FET devices, such as MOSFETs, for example.

In this arrangement, the switching transistors are alternatively activated (e.g., placed in the ON state), providing energy to a load, through the output inductor and across the output filter capacitor. The output voltage is regulated by a controller (e.g., control circuit), which determines the ON and OFF cycles of the switching transistors. Therein, the switching transistors are alternatively placed in the ON state since placing the switching transistors simultaneously in the ON state would effectively create a short circuit across the input voltage.

The transitions when both switching transistors are in the OFF state for a brief period of time are commonly referred to as dead times. During these periods, the output inductor produces a freewheeling current that flows through the body diode of the low-side switching transistor. The large forward voltage drop of the body diode results in high diode conduction and reverse recovery losses and adds to the thermal stress on the low-side switching transistor. As this process is repeated during every switching cycle, it also places a limitation of the maximum switching frequency of the switching mode power converter. This in turn prevents size reduction of the switching mode power converter, which would be a major benefit to end products such as portable equipment.

In addition, MOSFET parasitic body diode reverse recovery occurs during diode switching from the ON state to the OFF state since its stored minority charges must be removed. The minority charges may be removed either actively via negative current, or passively via recombination inside the device. All stored charge should be removed so that the depletion region can become big enough to block the reverse voltage.

The aforementioned condition occurs in synchronous DC/DC power converters every time that the low-side switching transistor is turned OFF and the high-side switching transistor is going to turn ON. In other words, the accumulated charge in the body diode of the low-side switching transistor needs to be removed each time the high-side switching transistor is turned ON.

SUMMARY

There is a need for an improved switching mode power converter circuit, and for an improved method of switching mode power conversion. There further is a need for such circuit and method that improve removal of the inverse recovery charge in the body diode of the low-side switching transistor. There is yet further need for such circuit and method that do not require additional components. In view of some or all of these needs, the present document proposes a switching mode power converter circuit and a method of operating a switching mode power converter circuit having the features of the respective independent claims.

An aspect of the disclosure relates to a switching mode power converter circuit. The switching mode power converter circuit may be any one of a buck circuit, a boost circuit, a buck-boost circuit, or a topology derived from a buck circuit, a boost circuit and a buck-boost circuit, for example. In general, the switching mode power converter circuit may be a DC/DC synchronous power converter, for example. The switching mode power converter circuit may include a first transistor switch (first switching transistor) and a second transistor switch (second switching transistor) coupled (e.g., connected) in series between an input voltage level and ground. The first and second transistor switches may be FET devices, such as MOSFETs, for example. The switching mode power converter circuit may further include a control circuit for controlling switching operation of the first transistor switch and the second transistor switch. Switching operation of the first and second transistor switches may be performed for each of a plurality of consecutive cycles, and the control circuit may control switching operation of the first and second transistor switches on a cycle-by-cycle basis. The control circuit may operate in accordance with an external control signal (e.g., a PWM control signal) for regulating an output voltage of the switching mode power converter circuit. The switching mode power converter circuit may further include a detection circuit for sensing a voltage at an intermediate node (e.g., switching node, LX node) arranged between the first transistor switch and the second transistor switch. The detection circuit may be further configured to generate a switching control signal for the control circuit on the basis of a waveform of the sensed voltage. In particular, the detection circuit may be configured to derive an indication of a slope (e.g., time derivative, change rate) of the sensed voltage, and to generate the switching control signal on the basis of the derived indication of the slope of the sensed voltage. For example, the indication of a slope of the sensed voltage may be derived as a voltage difference per time interval, or the voltage detection circuit may be configured to measure the time derivative of the sensed voltage. The control circuit may be configured to set a first timing for activating the first transistor switch (e.g., for switching the first transistor switch to the ON state, i.e., to the fully conducting state) and/or a second timing for activating the second transistor switch on the basis of the switching control signal. The switching control signal may be a digital signal. The switching mode power converter circuit may further include an output circuit for providing an output voltage, for example to a load. The output circuit may be coupled to the intermediate node. The output circuit may include an output inductor and an output capacitor (e.g., output filter capacitor) coupled (e.g., connected) in series between the intermediate node and ground, for outputting an output voltage at an output node arranged between the output inductor and the output capacitor.

By utilizing a rate of change threshold of the voltage waveform (dv/dt detection) of the LX voltage rather than a voltage threshold for the LX voltage, accuracy of the dead time measurement can be improved an the probability of false detection of the dead time can be reduced. Thus, configured as above, the switching mode power converter circuit allows to accurately determine the dead time of switching operation and to adjust the switching operation in accordance with the determined dead time, thereby reducing the reverse recovery charge that needs to be removed. In other words, a better resolution in determining the dead time can be achieved which provides for better loss attenuation (smaller reverse recovery losses), and thus higher efficiency of the switching mode power converter circuit. At the same time, optimizing the dead time also results in reduced thermal stress on the low-side switching transistor and allows for higher maximum switching frequency. Since optimization of the dead time can be performed on a cycle-by-cycle basis, it may adapt to variations in components as well as operating conditions, such as temperature.

In embodiments, the switching control signal may be indicative of a dead time of the switching mode power converter circuit. The dead time may be understood to indicate a period of time during which both the first transistor switch and the second transistor switch are in the OFF state (e.g., in a substantially non-conducting state). In particular, the switching control signal may be indicative of the dead time before the first transistor switch (as the transistor switch arranged closer to the input voltage level) is turned to the ON state.

In embodiments, the control circuit may be configured to set the first timing and/or the second timing on the basis of the switching control signal in such a manner that the dead time of the switching mode power converter circuit is reduced. In general, the first and/or second timing may be set such that the dead time is within a predetermined range for the dead time. In particular, this technique may be applied to the dead time before the first transistor switch (as the transistor switch arranged closer to the input voltage level) is turned to the ON state. In this case, the first timing may be set on the basis of the switching control signal. Reducing the dead time results in reduced thermal stress on the low-side transistor switch and reduces the reverse recovery charge, as indicated above.

In embodiments, the detection circuit may include a slope detector circuit. The slope detector circuit may be configured to derive the indication of the slope (e.g., time derivative, change rate) of the sensed voltage. For example, the indication of a slope of the sensed voltage may be derived as a voltage difference per time interval, or the slope detection circuit may be configured to measure the time derivative of the sensed voltage. The slope detector circuit may be further configured to generate one or more intermediate signals indicative of respective timings at which a magnitude of the slope of the sensed voltage exceeds a predetermined threshold (or predetermined thresholds).

In embodiments, the slope detector circuit may be configured to generate a first intermediate signal indicative of respective timings at which the slope of the sensed voltage exceeds a predetermined positive threshold. The slope detector circuit may be further configured to generate a second intermediate signal indicative of respective timings at which the slope of the sensed voltage drops below a predetermined negative threshold. The first and second intermediate signals may be signals including level transitions (flanks) at the aforementioned respective timings. The slope detector circuit may include a positive slope detector circuit for generating the first intermediate signal and a negative slope detector circuit for generating the second intermediate signal.

In embodiments, the slope detector circuit may include a current mirror of two gate-connected transistors. The slope detector circuit may further include a comparator. Each transistor of the current mirror may be connected in series with a respective current source. A first node between one of the transistors and its respective current source may be coupled (e.g., connected) to a second node between the other one of the transistors and its respective current source via a resistance element. The first node may be coupled (e.g., connected) to the intermediate node arranged between the first and second transistor switches. The second node may be coupled to an input port of the comparator. An output of the comparator may serve as one of the one or more intermediate signals.

In embodiments, the detection circuit may include a time-to-digital conversion circuit. The time-to-digital conversion circuit may be configured to generate, as the switching control signal, a digital signal indicative of a dead time of the switching mode power converter circuit on the basis of the one or more intermediate signals. The digital signal may indicate the dead time in thermometric code.

In embodiments, the time-to-digital conversion circuit may include a delay line comprising a plurality of inverters. The time-to-digital conversion circuit may further include a shift register. The shift register may be clocked by one of the one or more intermediate signals. Another one of the one or more intermediate signals may be fed to the delay line. For each inverter among the plurality of inverters, an output of the respective inverter may be fed to a respective corresponding stage of the shift register.

By the above configuration, a digital signal indicative of the dead time of switching operation can be generated in an accurate, yet efficient manner.

In embodiments, the detection circuit may be at least partially disabled for at least a portion of the period of time during which either one of the first transistor switch or the second transistor switch is activated.

Thereby, it can be ensured that the detection circuit is only active when needed, namely during periods of time in which the dead time under consideration is expected to occur. This allows to reduce overall power consumption of the switching mode power converter circuit.

Another aspect of the disclosure relates to a method of operating a switching mode power converter circuit. The switching mode power converter circuit may include a first transistor switch and a second transistor switch coupled in series between an input voltage level and ground. The method may include sensing a voltage at an intermediate node arranged between the first transistor switch and the second transistor switch. The method may further include generating a switching control signal on the basis of a waveform of the sensed voltage. In particular, generating the switching control signal may involve deriving an indication of a slope of the sensed voltage, and generating the switching control signal may involve generating the switching control signal on the basis of the derived indication of the slope of the sensed voltage. The method may further include controlling switching operation of the first transistor switch and the second transistor switch in accordance with the switching control signal. The controlling may involve setting a first timing for activating the first transistor switch and/or a second timing for activating the second transistor switch on the basis of the switching control signal.

In embodiments, the switching control signal may be indicative of a dead time of the switching mode power converter circuit.

In embodiments, the controlling may involve setting the first timing and/or the second timing on the basis of the switching control signal in such a manner that the dead time of the switching mode power converter circuit is reduced.

In embodiments, the method may further include generating one or more intermediate signals indicative of respective timings at which a magnitude of the slope of the sensed voltage exceeds a predetermined threshold (or predetermined thresholds).

In embodiments, generating the one or more intermediate signals may involve generating a first intermediate signal indicative of respective timings at which the slope of the sensed voltage exceeds a predetermined positive threshold. Generating the one or more intermediate signals may further involve generating a second intermediate signal indicative of respective timings at which the slope of the sensed voltage drops below a predetermined negative threshold.

In embodiments, generating the one or more intermediate signals may involve generating a voltage pulse indicative of a magnitude of the slope of the sensed voltage. Generating the one or more intermediate signals may further involve comparing a magnitude of the voltage pulse to a predetermined threshold voltage.

In embodiments, the method may further include generating, as the switching control signal, a digital signal indicative of a dead time of the switching mode power converter circuit on the basis of the one or more intermediate signals.

In embodiments, generating the digital signal may involve clocking a shift register by one of the one or more intermediate signals. Generating the digital signal may further involve feeding another one of the one or more intermediate signals to a delay line comprising a plurality of inverters. Generating the digital signal may yet further involve, for each inverter among the plurality of inverters, feeding an output of the respective inverter to a respective corresponding stage of the shift register.

In embodiments, the method may further include disabling sensing the voltage at the intermediate node for at least a portion of the period of time during which either one of the first transistor switch or the second transistor switch is activated.

Notably, the method may be applied to any of the circuits described above, for example as a method of operating these circuits.

It is understood that in the present document, the term "couple" or "coupled" refers to elements being in electrical communication with each other, whether directly connected e.g., via wires, or in some other manner.

Moreover, it will be appreciated that method steps and apparatus features may be interchanged in many ways. In particular, the details of the disclosed method can be implemented as an apparatus adapted to execute some or all the steps of the method, and vice versa, as the skilled person will appreciate. In particular, it is understood that methods according to the disclosure relate to methods of operating the circuits according to the above embodiments and variations thereof, and that respective statements made with regard to the circuits likewise apply to the corresponding methods. Repetition of such statements for the corresponding methods may have been omitted for reasons of conciseness.

BRIEF DESCRIPTION OF THE DRAWINGS

Embodiments of the disclosure are explained below in an exemplary manner with reference to the accompanying drawings, in which like reference numerals are understood to indicate identical or similar elements, unless indicated otherwise, and repeated description thereof may be omitted. Therein, FIG. 1 schematically illustrates an example of a switching mode power converter circuit to which embodiments of the disclosure may be applied, FIG. 2 schematically illustrates another example of a switching mode power converter circuit to which embodiments of the disclosure may be applied.

DESCRIPTION

The present disclosure is applicable to any kind of DC/DC synchronous power converter (e.g., switching mode power converter). For example, the present disclosure may be applied to a buck circuit, a boost circuit, a buck-boost circuit, and isolated topologies derived from a buck circuit, a boost circuit and a buck-boost circuit. For the sake of conciseness, without intended limitation, reference may be made to a buck converter in the remainder of the disclosure.

Figure 1:
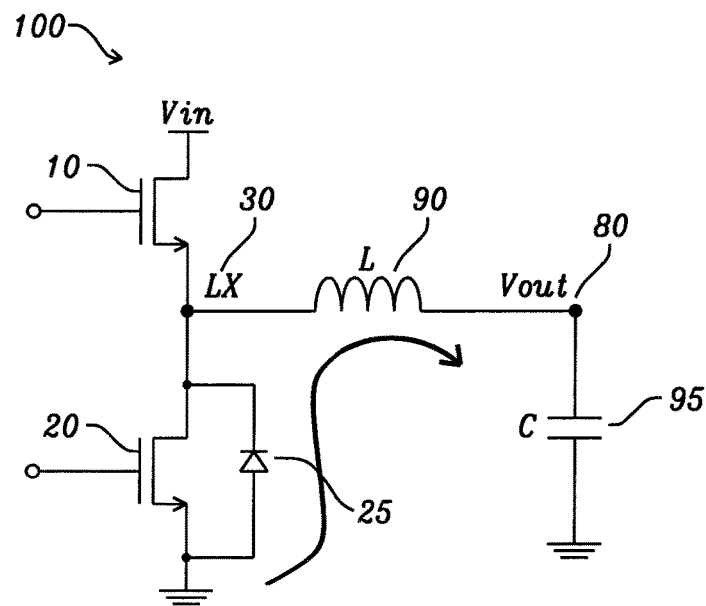

A buck converter 100 (as a non-limiting example of a switching mode power converter circuit) is illustrated in FIG. 1. The buck converter 100 may comprise a first transistor switch (high-side transistor switch) 10 and a second transistor switch (low-side transistor switch) 20 that are connected (or in general, coupled) between an input voltage level (e.g., supply voltage level) Vin and ground. The first transistor switch 10 may be arranged closer to the input voltage level, and the second transistor switch 20 may be arranged closer to ground. The first and second transistor switches 10, 20 may be FET devices, such as MOSFETs (e.g., PMOS transistors or NMOS transistors). The buck converter 100 may further comprise an output circuit comprising an output inductor 90 and an output capacitor (e.g. output filter capacitor) 95 coupled in series between an intermediate node (e.g. switching node, LX node) 30 arranged between the first and second transistor switches 10, 20, and ground. An output voltage Vout may be provided at an output node 80 arranged between the output inductor 90 and the output capacitor 95.

Figure 2:
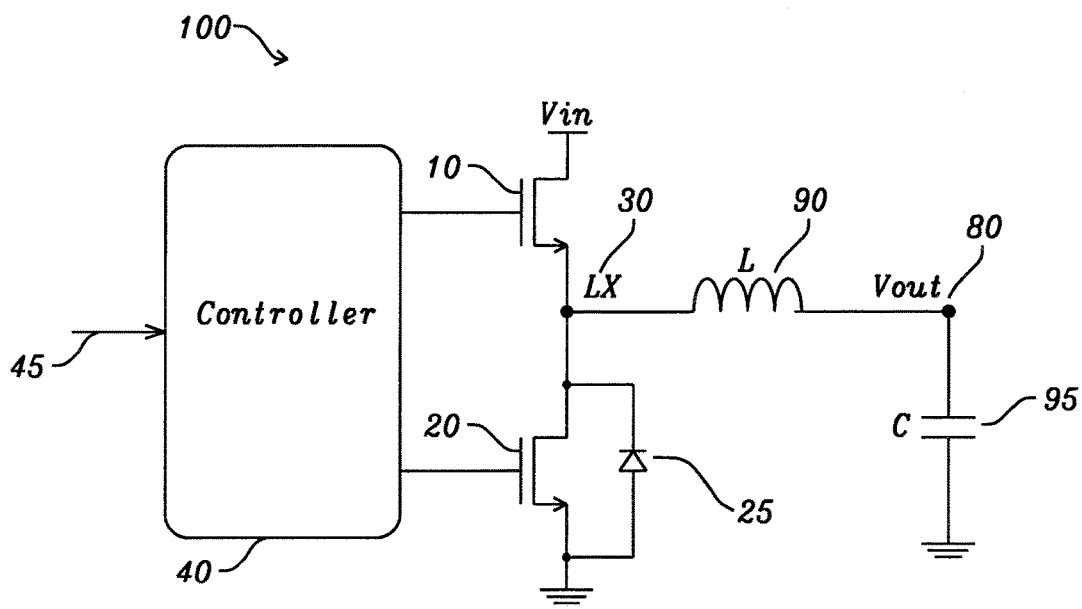

FIG. 2 further illustrates a controller (e.g., disoverlap controller, or more general, control circuit) 40 of the buck converter 100 for controlling switching operation of the transistor switches 10, 20. The controller 40 may receive an external control signal 45 that may indicate for example a switching cycle for the switching transistors 10, 20, and may in general be used for regulation of the output voltage. The external control signal 45 may be a PWM signal, for example.

The buck converter 100 is affected by the issues indicated at the outset. Namely, during the dead times (both transistor switches are in the OFF state), the output inductor 90 may produce a freewheeling current that flows through the body diode 25 of the second transistor switch 20 in FIG. 1. The large forward voltage drop of the body diode 25 may result in high diode conduction and reverse recovery losses. Moreover, parasitic body diode reverse recovery may occur during diode switching from the ON state to the OFF state since its stored minority charges must be removed. The minority charges may be removed either actively via negative current, or passively via recombination inside the device. All stored charge should be removed so that the depletion region can become big enough to block the reverse voltage.

The aforementioned condition may occur every time that the second transistor switch 20 is turned OFF and the first transistor switch 10 is going to turn ON. In other words, the accumulated charge (reverse recovery charge, QRR) in the body diode 25 of the second transistor switch 20 needs to be removed each time the first transistor switch 10 is turned ON.

Figure 3:
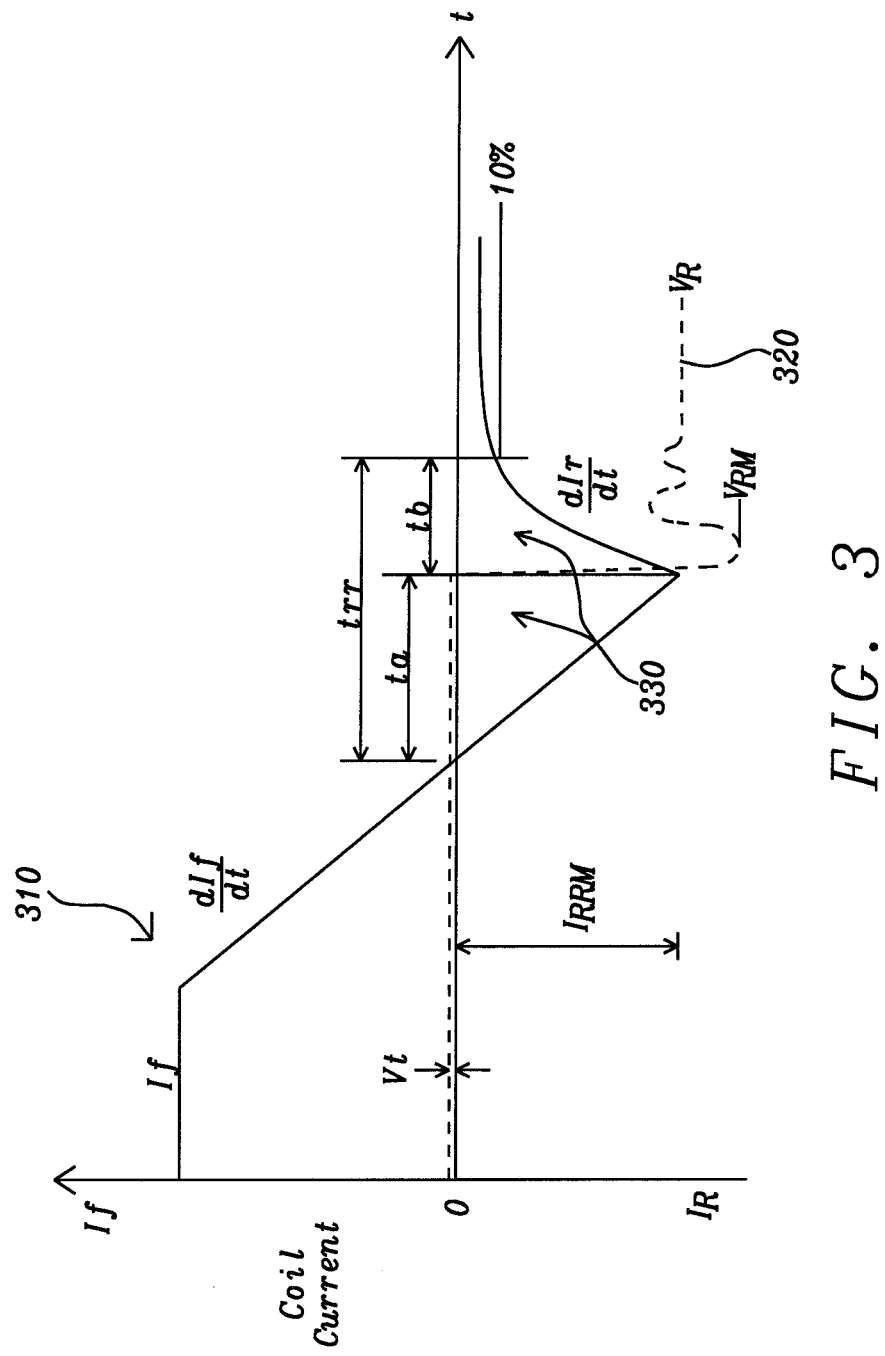
FIG. 3 is schematically illustrates examples of a current waveform and a voltage waveform in the switching mode power converter circuits of FIG. 1 and FIG. 2, FIG. 4 schematically illustrates an example of a time chart of switching operation in the switching mode power converter circuits of FIG. 1 and FIG. 2, FIG. 5 schematically illustrates an example of a switching mode power converter circuit according to embodiments of the disclosure, FIG. 6 schematically illustrates an example of slope detection signals in switching mode power converter circuits according to embodiments of the disclosure, FIG. 7 schematically illustrates an example of a slope detector circuit in switching mode power converter circuits according to embodiments of the disclosure, FIG. 8 schematically illustrates an example of a time-to-digital conversion circuit in switching mode power converter circuits according to embodiments of the disclosure, FIG. 9 schematically illustrates another example of slope detection signals in switching mode power converter circuits according to embodiments of the disclosure, FIG. 10 schematically illustrates an example of a time chart of switching operation in the switching mode power converter circuits of FIG. 1 and FIG. 2, FIG. 11 schematically illustrates an example of a time chart of switching operation in switching mode power converter circuits according to embodiments of the disclosure, FIG. 12 schematically illustrates a flow chart for dead time optimization in switching mode power converter circuits according to embodiments of the disclosure, and FIG. 13 schematically illustrates an example of a voltage waveform in switching mode power converter circuits according to embodiments of the disclosure.

FIG. 3 schematically illustrates examples of a current waveform 310 of the coil current If (e.g. flowing through the output inductor 90) and a voltage waveform 320 of the coil voltage Vf (e.g., at the output inductor 90) in the switching mode power converter circuit of FIG. 1 and FIG. 2. It is possible to see losses due to the dead time, where both the first and second transistor switches 10, 20 are OFF and the coil current though the output inductor 90 goes through the body diode 25 of the second transistor switch 20. The reverse recovery charge phenomenon (QRR phenomenon) depends on the coil current If and the time derivative dIf/dt of the coil current. The coil current If and the reverse recovery charge QRR have a positive relationship. In order to reduce or eliminate the reverse recovery charge QRR, one solution is to reduce the dead-time as much as possible. This limits the coil current If into the body diode, which causes the QRR phenomenon. The reverse recovery charge QRR is indicated by the area 330 confined by the horizontal axis and the graph indicating the (reverse) coil current in FIG. 3, i.e., by the time-integral of the (reverse) coil current over the time interval trr=(ta+tb).

Figure 4:
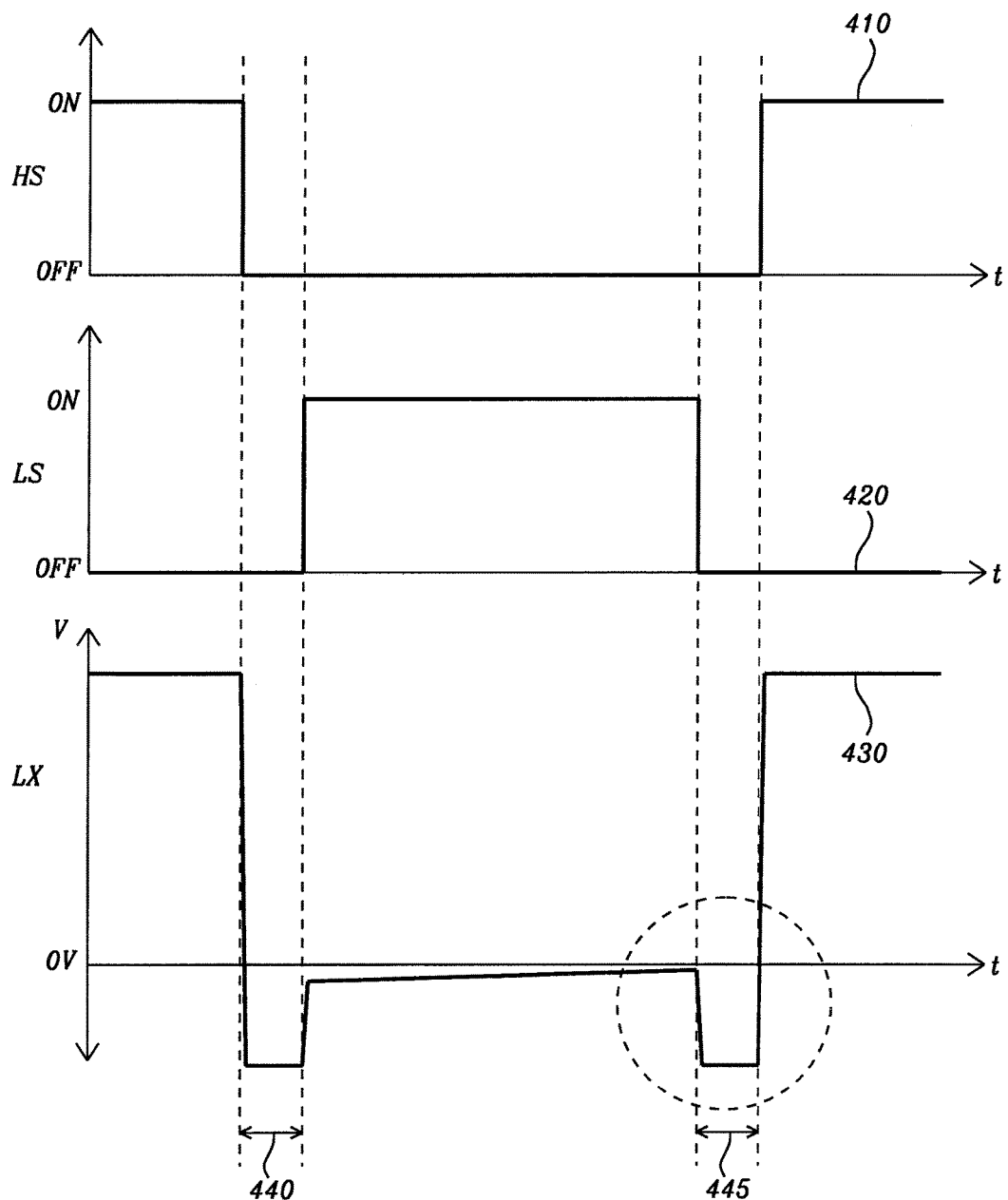

FIG. 4 schematically illustrates an example of a time chart of switching operation of the first and second transistor switches 10, 20 in the switching mode power converter circuits of FIG. 1 and FIG. 2. Graph 410 indicates the high-side switch control signal (e.g., gate signal) for the first transistor switch 10, graph 420 indicates the low-side switch control signal (e.g., gate signal) for the second transistor switch 20, and graph 430 indicates the voltage at the intermediate node (e.g., switching node, LX node) 30. As can be seen from graphs 410, 420, the second transistor switch 20 is switched ON a first period of time 440 after the first transistor switch has been switched OFF, and is switched OFF again a second period of time 445 before the first transistor switch 10 is switched ON. These first and second periods of time 440, 445 may be referred to as the (first and second) dead times. The QRR phenomenon is related to the second period of time 445 (indicated by a dashed circle in FIG. 4), i.e., is related to the second transistor switch 20 having been switched OFF and the first transistor switch 10 going to turn ON.

When the first transistor switch (high-side transistor switch) 10 is in the ON state, the intermediate node 30 is coupled to the input voltage level Vin. When the first transistor switch 10 is switched to the OFF state, the voltage at the intermediate node 30 decays rapidly. The (first) dead time (dead time period) is present until the second transistor switch (low-side transistor switch) 20 is placed in the ON state.

When the second transistor switch 20 is in the ON state, the voltage at the intermediate node 30 is nearly zero (0V) as the intermediate node 30 is coupled to ground. When the second transistor switch 20 is transitioned to the OFF state, the voltage at the intermediate node 30 experiences a sharp negative fall, which begins the (second) dead time (dead time period). When the first transistor switch 10 is placed in the ON state, the intermediate node 30 is again coupled to the input voltage level Vin and the voltage at the intermediate node 30 experiences a rapid rise.

One approach to address the issue at hand and to reduce losses caused by the freewheeling current, is to place a low forward drop Schottky diode in parallel with the body diode 25 of the second transistor switch 20. However, this adds to the overall system cost and size.

Another approach is to reduce (or in general, optimize) the dead time in order to limit the freewheeling current and the reverse recovery charge.

Broadly speaking, the general idea of the present disclosure is to detect the dead time window employing dv/dt thresholds (e.g., thresholds for a time derivative, or slope, of the voltage at the switching node), and then to reduce (in general, optimize) the dead time, for example via digital control. More particularly, the present disclosure suggests to sense the slope of the terminal between the high-side switch (high-side transistor switch) and the low-side switch (low-side transistor switch) to provide an indication of how long to delay the pulse to activate the high-side switch or the low-side switch. Notably, while the QRR phenomenon relates to the second dead time indicated in FIG. 4, the present disclosure may be applied for reducing (in general, optimizing) either or both dead times.

Figure 5:
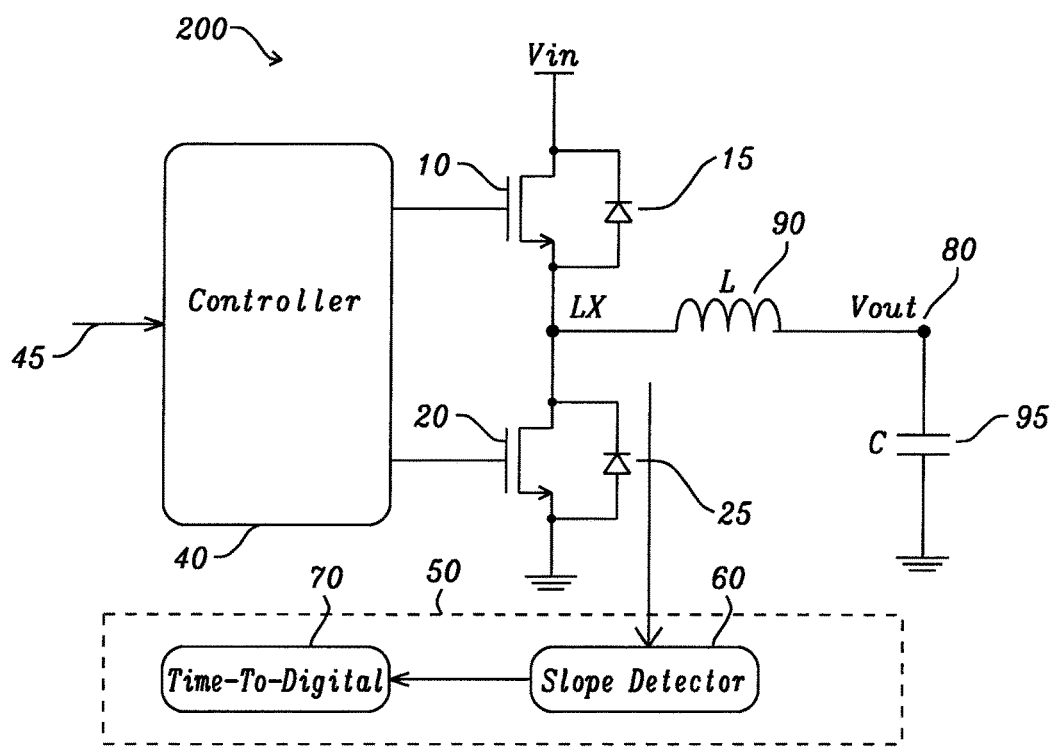

An example of a switching mode power converter circuit 200 according to embodiments of the disclosure is illustrated in FIG. 5. Similarly to the the switching mode power converter circuit 100 of FIG. 1 and FIG. 2, the switching mode power converter circuit 200 may comprise a first transistor switch 10 and a second transistor switch 20 that may be coupled (e.g., connected) in series between an input voltage level Vin and ground. The first and second transistor switches 10, 20 may be FET devices, such as MOSFETs (e.g., PMOS transistors or NMOS transistors). Both first and second transistor switches 10, 20 may have respective body diodes 15, 25. An intermediate node 30 (e.g., switching node, LX node) 30, that may be a common node of the first and second transistor switches 10, 20 and of an output circuit, may be arranged between the first and second transistor switches 10, 20. The output circuit may be connected to the intermediate node 30. The output circuit may comprise an output inductor 90 and an output capacitor (e.g., output filter capacitor) 95 which may be coupled (e.g., connected) in series between the intermediate node 30 and ground. An output node 80 for providing an output voltage Vout may be arranged between the output inductor 90 and the output capacitor 95. The switching mode power converter circuit 200 may further comprise a controller (e.g., disoverlap controller, or more general, control circuit) 40 for controlling switching operation of the first and second transistor switches 10, 20. The control circuit 40 may receive an external control signal 45 that may indicate for example a switching cycle for the switching transistors 10, 20, and may in general be used for regulation of the output voltage. The external control signal 45 may be a PWM signal, for example.

Compared to the switching mode power converter circuit 100 of FIG. 1 and FIG. 2, the switching mode power converter circuit 200 may additionally comprise a detection circuit 50. The detection circuit 50 may sense a voltage at the intermediate node 30. The detection circuit 50 may further generate a switching control signal for the control circuit 40 on the basis of a waveform of the sensed voltage (e.g., a waveform of the voltage at the intermediate node 30). The switching control signal may be fed to the control circuit 40. The control circuit 40 may perform control of switching operation of the first and second transistor switches 10, 20 on the basis of the switching control signal. For example, the control circuit 40 may set a first timing for activating the first transistor switch 10 and/or set a second timing for activating the second transistor switch 20 on the basis of the switching control signal. In embodiments, the control circuit 40 may set respective delays for activating the first and/or second transistor switch 10, 20 after the respective other one of the first and second transistor switches 10, 20 has been turned OFF.

The switching control signal may be generated (e.g. updated) for every switching cycle of the first and second transistor switches 10, 20, and the control circuit 40 may perform control of the switching operation of the first and second transistor switches 10, 20 on the basis of the switching control signal for every cycle (e.g., on a cycle-by-cycle basis).

The detection circuit 50 may derive an indication of a (positive or negative) slope (e.g., time derivative, dV/dt) of the sensed voltage. Further, the detection circuit 50 may generate the switching control signal on the basis of the derived indication of the slope. The detection circuit may determine (e.g. calculate) and indication of a dead time (either or both of the first and second dead times) on the basis of the derived indication of the slope. Accordingly, the switching control signal may be indicative of the dead time (either or both of the first and second dead times). The switching control signal may be a digital signal, for example a digital signal indicative of the dead time, and the control circuit 40 may be a digital control circuit (e.g., digital controller).

The control circuit 40 may control switching operation of the first and second transistor switches 10, 20 on the basis of the switching control signal in such a manner that the respective dead time or dead times are reduced (in general, optimized). For example, the control circuit 40 may, on the basis of the switching control signal, set the first and/or second timing (or respective delays for activating the first and second transistor switches 10, 20) to values that result in a minimum dead time for avoiding shoot-through currents. This may involve controlling the respective dead time or dead times to be within a predetermined range or predetermined ranges.

Without intended limitation, the case of the first timing for activating the first transistor switch 10 after the second transistor switch 20 has been switched OFF will be discussed in the following. This may amount to reducing or optimizing the second dead time in FIG. 4. As indicated above, the present disclosure may be applied for optimization of either or both dead times.

The detection circuit 50 may comprise a slope detector circuit 60. The slope detector circuit 60 may sense the positive and negative slopes of the voltage at the intermediate node 30 and generate two intermediate signals. In general, the slope detector circuit 60 may derive the indication of the slope of the sensed voltage. The slope detector circuit 60 may further generate one or more (for example, two) intermediate signals indicative of respective timings at which a magnitude of the slope of the sensed voltage exceeds a predetermined threshold. For the case of two intermediate signals, a first intermediate signal Splus may indicate respective timings (e.g., on a cycle-by-cycle basis) at which the positive-valued slope exceeds a first (positive) predetermined threshold. A second intermediate signal Sminus may indicate respective timings (e.g., on a cycle-by-cycle basis) at which the negative-valued slope drops below a second (negative) predetermined threshold. The first and second predetermined thresholds may be equal to each other in magnitude. The first and second intermediate signals Splus, Sminus may include pulses or flanks at the aforementioned respective timings.

The slope detector circuit 60 may comprise a positive slope detector (+dV/dt detection circuit) and a negative slope detector (−dV/dt detection circuit) for generating the first and second intermediate signals Splus, Sminus, respectively. Alternatively, the slope detector circuit 60 may relate to a single slope detector sensitive to a magnitude of the slope. In this case, a logic may be applied for deciding on whether the magnitude of the slope exceeding a predetermined threshold implies that the positive-valued slope exceeds the predetermined threshold or that the negative-valued slope drops below the negative of the predetermined threshold. On the basis of the outcome of this logic, the first and second intermediate signals Splus, Sminus may be generated. Further alternatively, a single intermediate signal indicating respective timings at which the magnitude of the slope exceeds the predetermined threshold may be generated, and a logic may be applied to the single intermediate signal in order to decide whether a respective timing is a timing at which the slope has exceeded the predetermined threshold or a timing at which the slope has dropped below the negative of the predetermined threshold. In the following, without intended limitation, it will be assumed that the slope detector circuit 60 generates first and second intermediate signals Splus, Sminus.

The detection circuit 50 may further comprise a time-to-digital conversion circuit (e.g., time counter) 70 that may receive the one or more (e.g., two) intermediate signals as an input. The time-to-digital conversion circuit 70 may generate, on the basis of the intermediate signals, an indication of the dead time. For example, when receiving the first and second intermediate signals Splus, Sminus, the time-to-digital conversion circuit 70 may measure (e.g., count) a time period between a timing at which the (negative-valued) slope of the sensed voltage has dropped below the second (negative) predetermined threshold and a subsequent timing at which the (positive-valued) slope of the sensed voltage has exceeded the first (positive) predetermined threshold. Put differently, the time-to-digital conversion circuit 70 may measure the time difference between the second and first intermediate signals Sminus, Splus. Thus, the time-to-digital conversion circuit 70 may generate, as the switching control signal, a digital signal indicative of the dead time on the basis of the one or more intermediate signals (e.g., two intermediate signals, Splus, Sminus). The generated switching control signal may then be fed to the control circuit 40 for controlling a voltage at a control terminal (e.g. gate terminal) of the first transistor switch 10 such that the dead time is reduced (in general, optimized).

The aforementioned process may be repeated for each switching cycle to continuously adapt the timing for activating the first transistor switch 10 in order to reduce the dead time as much as possible. In this way, any overall system can be provided that is not temperature and process dependent.

Notably, the above discussion applies to the second dead time in FIG. 4, with evident adaptations for the case of the first dead time.

By virtue of the above configuration, the switching mode power converter circuit 200 according to embodiments of the disclosure sets time delays for activating the first and/or second transistor switches 10, 20 to a minimum value to avoid shoot-through currents. By use of a slope detector circuit 60, a time-to-digital conversion circuit 70 and ad-hoc digital control by the control circuit 40, the switching mode power converter circuit 200 actively controls the delay for placing the high-side transistor switch (first transistor switch) 10 and/or low-side transistor switch (second transistor switch) 20 in the ON state on a cycle-by-cycle basis, adapting for component and parameter variations. Since the switching mode power converter circuit 200 is adaptive, and most time delays are temperature dependent, temperature variation is easily compensated. By minimizing the non-overlay times (dead times), where the body diode of a transistor switch conducts significant current, power losses are minimized.

Furthermore, the switching mode power converter circuit 200 senses the cycle-by-cycle waveform of the voltage at the intermediate node 30 in order to adapt to component-to-component variations as well as to changes caused by operating environment (e.g. operating temperature).

In summary, the switching mode power converter circuit 200, including the detection circuit 50, can detect the dead time on a cycle-by-cycle basis and thus set the optimum dead time on a cycle-by-cycle basis.

Figure 6:
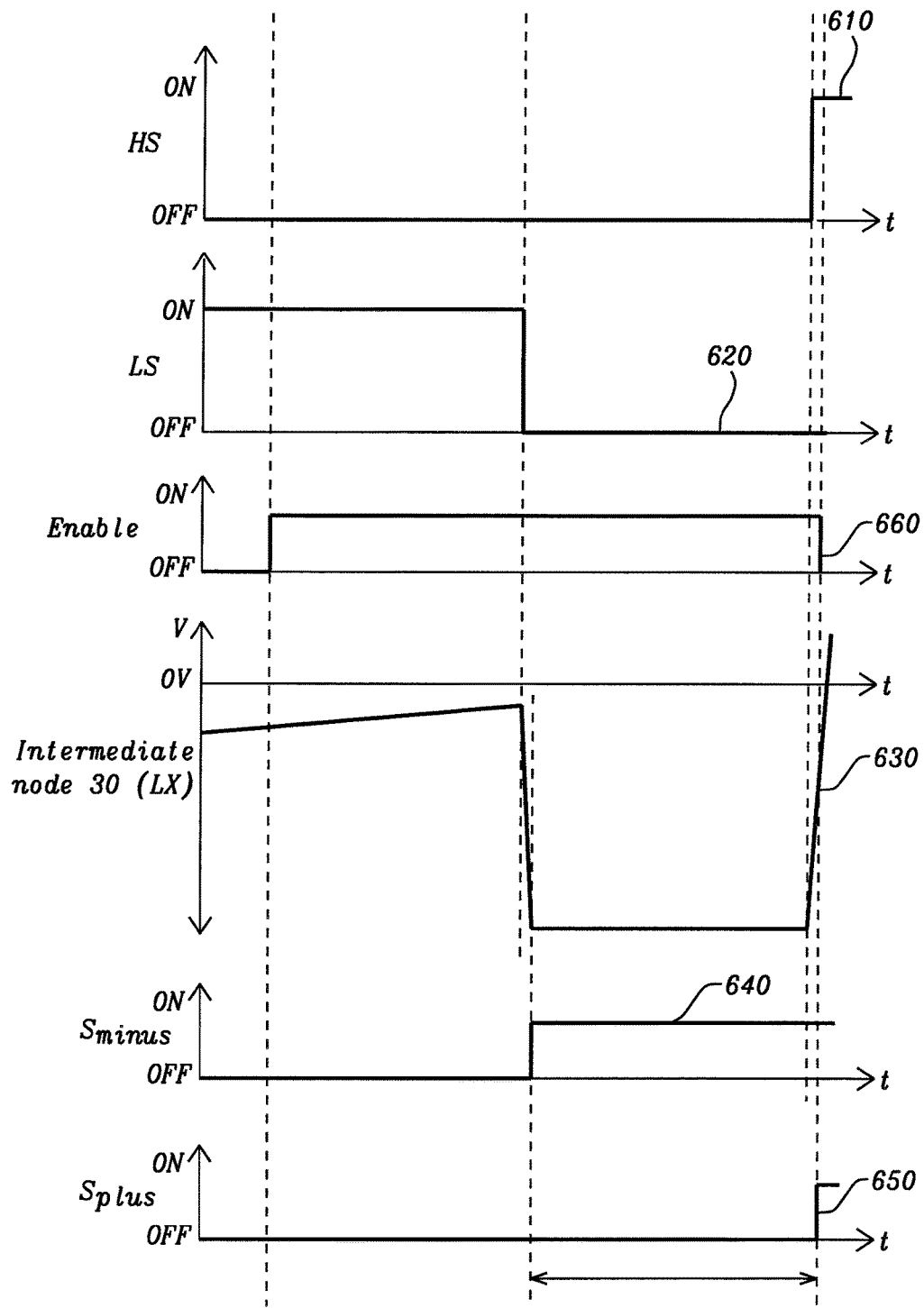

FIG. 6 is a detail of FIG. 4 and further schematically illustrates examples of slope detection signals (intermediate signals) in the switching mode power converter circuit 200. In particular, FIG. 6 shows a close-up view of the second dead time in FIG. 4. Graph 610 indicates the high-side switch control signal for the first transistor switch 10, graph 620 indicates the low-side switch control signal for the second transistor switch 20, and graph 630 indicates the voltage at the intermediate node 30. Further, graph 640 indicates the second intermediate signal Sminus (−dV/dt detection), and graph 650 indicates the first intermediate signal Splus (+dV/dt detection). Lastly, graph 660 indicates a signal for enabling the detection circuit 50.

As can be seen from graph 630, the voltage at the intermediate node 30 (LX voltage) rises slowly when the second transistor switch 20 is in the ON state. The voltage rise is based on the product of the current through the second transistor switch 20 and the ON-state resistance Ron of the second transistor switch 20. As soon as the second transistor switch 20 is switched to the OFF state, the LX waveform exhibits a sharp negative voltage. This occurrence triggers the −dv/dt threshold (e.g., the second predetermined threshold) and the second intermediate signal Sminus will indicate that the (negative-valued) slope has dropped below the second (negative) predetermined threshold for the slope of the sensed voltage. As soon as the first transistor switch 10 is turned ON, the slope of the LX voltage is sharply positive, triggering the +dv/dt threshold (e.g., the first predetermined threshold). The first intermediate signal Splus will indicate that the (positive-valued) slope has exceeded the first (positive) threshold for the slope of the sensed voltage. That is, the first and second intermediate signals Splus, Sminus indicate respective timings at which respective thresholds have been triggered, for example by including pulses or flanks at respective timings. The time differential between the triggering of the −dv/dt threshold and the +dv/dt threshold represents an accurate measurement of the dead-time period.

Since the sharp −dv/dt and +dv/dt characteristics of the LX voltage only occur during the switching of both the low-side and high-side transistor switches (first and second transistor switches) 10, 20, the risk of a not detecting a transistor switching is low. Similarly, a false detection is also unlikely. The first slope is a falling edge due to the turn ON of the body diode and the second slope is a rising edge that, due to the high-side transistor switch, is able to raise the LX node once that all of the reverse recovery charge have been removed. If the same disturbances were happening during the body diode ON-phase they would have very low dynamic range. Accordingly, with appropriate adjustment of the circuit these disturbances could be filtered out. Moreover, in this phase the circuit behaves like a diode so that have significant rising and falling edges would require a huge amount of spike current, which is typically not the case.

In order to reduce the overall power consumption, the risk of noise transients and other factors causing an erroneous detection, the −dv/dt and +dv/dt detection circuits (positive and negative slope detectors) may be enabled only during periods where the dead times are expected to occur, and may be disabled during periods for which dead times are not expected. This is illustrated by graph 660, which indicates the signal for enabling the detection circuit 50. Thus, the detection circuit 50 may be at least partially disabled for at least a portion of the period during which either one of the first and second transistor switches 10, 20 is activated (e.g., is in the ON state).

Figure 7:
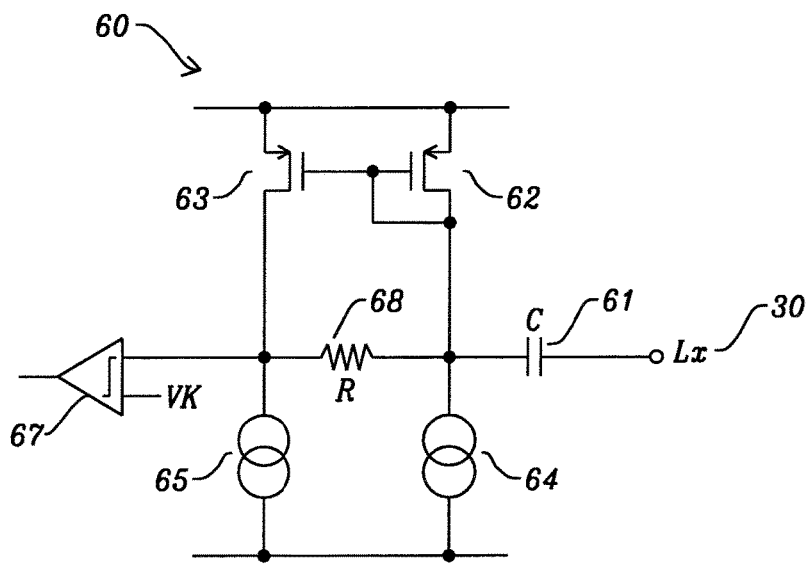

FIG. 7 schematically illustrates an example of the slope detector circuit 60. This circuit may be used as either one of the positive and negative slope detectors mentioned above, and may also be used as the single slope detector mentioned above. The slope detector circuit 60 may comprises a current mirror of two gate-connected transistors 62, 63. The input-side transistor 62 may have its gate terminal and drain terminal connected to each other. Each transistor 62, 63 of the current mirror may be coupled (e.g., connected) in series with a respective current source 64, 65. A first node between the input-side transistor 62 and its respective current source 64 may be coupled to a second node between the other transistor 63 of the current mirror and its respective current source 65 via a resistance element 68. The first node may be coupled to the intermediate node 30 arranged between the first and second transistor switches 10, 20. Said coupling may be effected through a capacitor 61. Further, a transistor 66 may be coupled (e.g., connected) between the first node and the input-side transistor 62. The slope detector circuit 60 may further comprise a comparator 67. The second node may be coupled to an input port of the comparator 67. The other input port of the comparator 67 may be supplied with a predetermined voltage VK that serves as a threshold voltage for the voltage at the second node. An output of the comparator 67 may serve as one of the one or more intermediate signals (e.g., Splus or Sminus). In this above configuration, the slope (e.g., time derivative) of the sensed voltage is transformed into a glitch (voltage pulse) that is in turn fed to the comparator 67 for comparison to the threshold voltage. Notably, a single such circuit and a single threshold voltage may be sufficient for the purposes of the present disclosure if an output of the circuit is considered at respective timings at which positive or negative slopes of the sensed voltage are expected. Further, as indicated above, the circuit may be disabled for periods of time during which slopes for detection are not expected.

Figure 8:
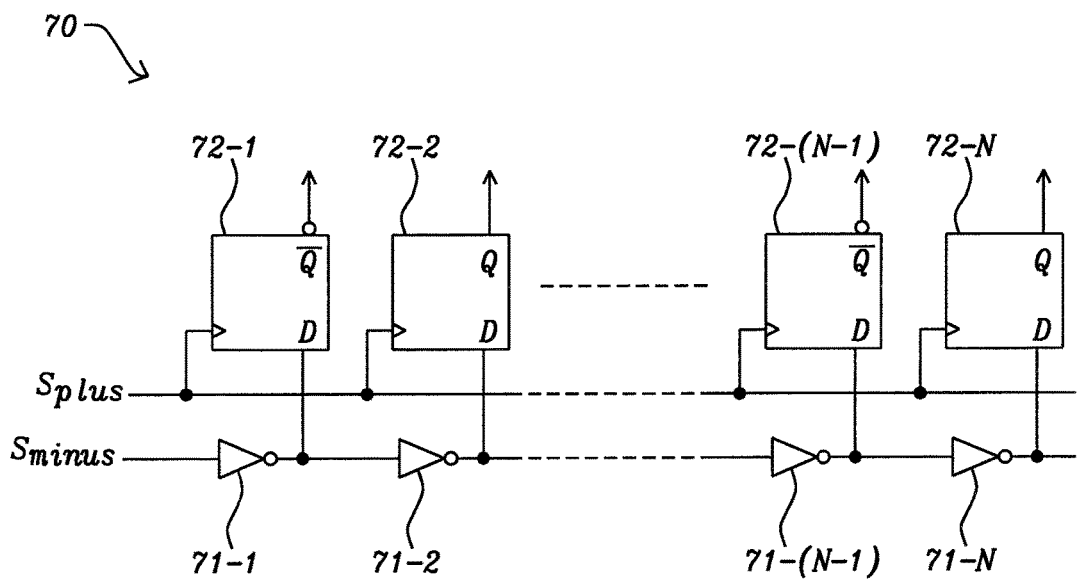

FIG. 8 schematically illustrates an example of the time-to-digital conversion circuit 70. The time-to-digital conversion circuit 70 may serve as a time counter. The time-to-digital conversion circuit 70 in this example is based on a delay line made up from a plurality of single inverters 71-1, 71-2, . . . , 71-N. Respective outputs of the inverters 71 are latched into a bank of registers (shift register) 72-1, 72-2, . . . , 72-N clocked by one of the intermediate signals, for example the intermediate signal generated by the positive slope detector (first intermediate signal Splus). Each stage of the shift register may be a D flip-flop. The number of stages of the shift register may be equal to the number of inverters in the delay line. The other intermediate signal, for example the intermediate signal generated by the negative slope detector (negative slope intermediate signal Sminus), starts to propagate through the delay line. Then, the one of the intermediate signals (e.g., positive slope intermediate signal Splus) flashes the exact number of inverters that have changed their output, and the information about the delay between negative and positive slope of the sensed voltage will be proportional to the number of inverters that have triggered their output between the second and first intermediate signals Sminus and Splus (e.g., between respective timings indicated by these signals). The time-to-digital conversion circuit 70 does not require a fast clock to measure the Sminus–Splus time delay while the accuracy is good as long as the inverter propagation delay is small. The output of the time-to-digital conversion circuit 70 may be indicative of the dead time. The output of the time-to-digital conversion circuit 70 my serve as the switching control signal.

Figure 9:
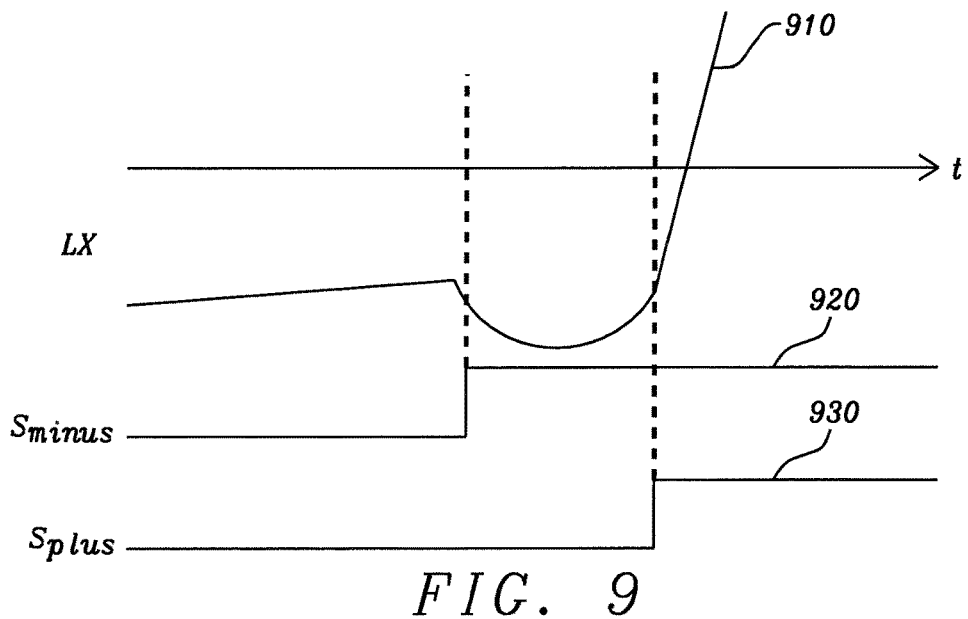

FIG. 9 schematically illustrates an example of the first and second intermediate signals Splus, Sminus. Graph 910 indicates the voltage at the intermediate node 30, graph 920 indicated the second intermediate signal Sminus, and graph 930 indicates the first intermediate signal Splus. The signal changes (flanks) of the first and second intermediate signals indicate timings at which the positive-valued or negative-valued slope, respectively, has triggered its respective threshold.

Figure 10:
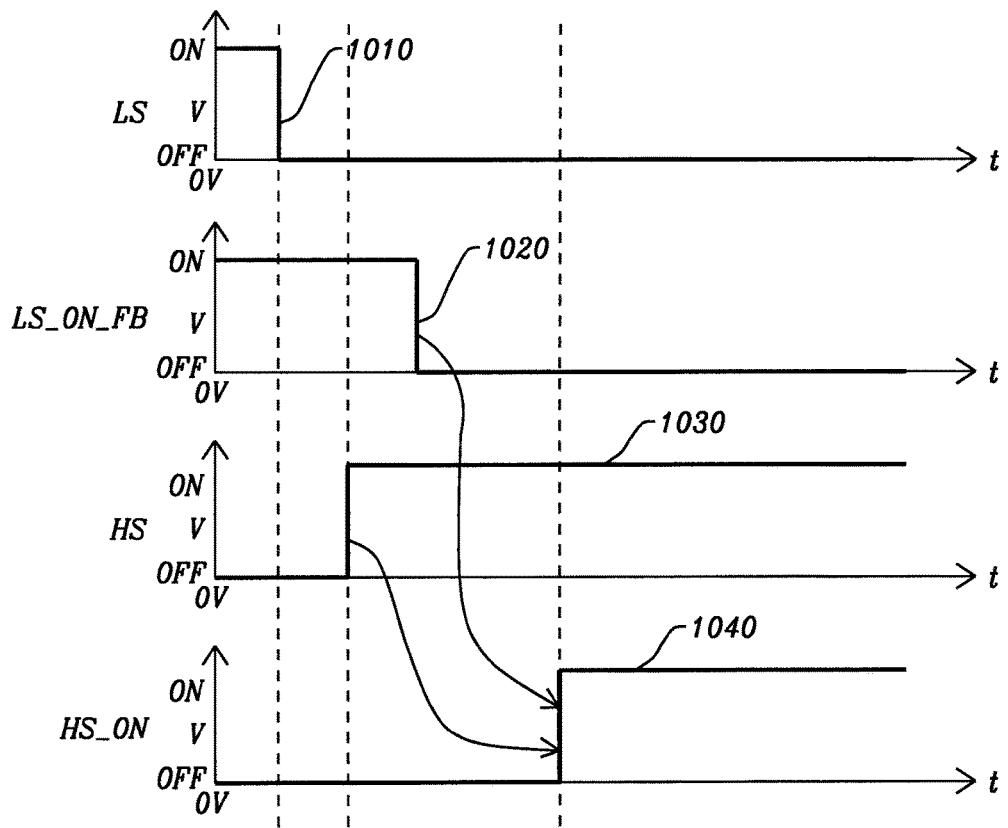

In order to understand how the slope detector circuit 60 and time-to-digital conversion circuit 70 interact with the control circuit 40 (e.g., disoverlap circuitry) it is useful to compare switching operation for the switching mode power converter circuit 100 of FIG. 1 and FIG. 2 and for the switching mode power converter circuit 200 according to embodiments of the disclosure. FIG. 10 schematically illustrates an example of the former, while FIG. 11 schematically illustrates an example of the latter.

In FIG. 10, graph 1010 indicates the low-side switch control signal LS for the low-side transistor switch (second transistor switch) 20, graph 1030 indicates the high-side switch control signal HS for the high-side transistor switch (first transistor switch) 10. The high-side switch control signal HS and the low-side switch control signal LS may be supplied from an external controller, for example from the buck modulator, and may be generated on the basis of an error voltage. Typically, the first and second transistor switches 10, 20 may switch almost together, the first transistor switch 10 slightly after the second transistor switch 20. However, in order to take into account for the front end delay of the front end it is necessary to trust on a (delayed) LS_ON_FB (low-side ON feedback) signal for turning ON the high-side transistor switch (first transistor switch) 10. This signal, indicated by graph 1020, comes from the low-side transistor switch (second transistor switch) 20, for example from the gate of a low-side MOSFET implementing the low-side transistor switch 20, and indicates when the low-side transistor switch 20 is really turned OFF. Graph 1040 indicates the actual switching control signal HS_ON of the high-side transistor switch 10 that is delayed in accordance with the low-side ON feedback signal LS_ON_FB. As can be seen from graph 1040, the HS_ON (High Side ON) signal goes high when HS is ON and LS_ON_FB is OFF. In this way every possible shoot through current is avoided. The drawback of this scheme, as described above, is the dead time during which all transistor switches are turned OFF.

Figure 11:
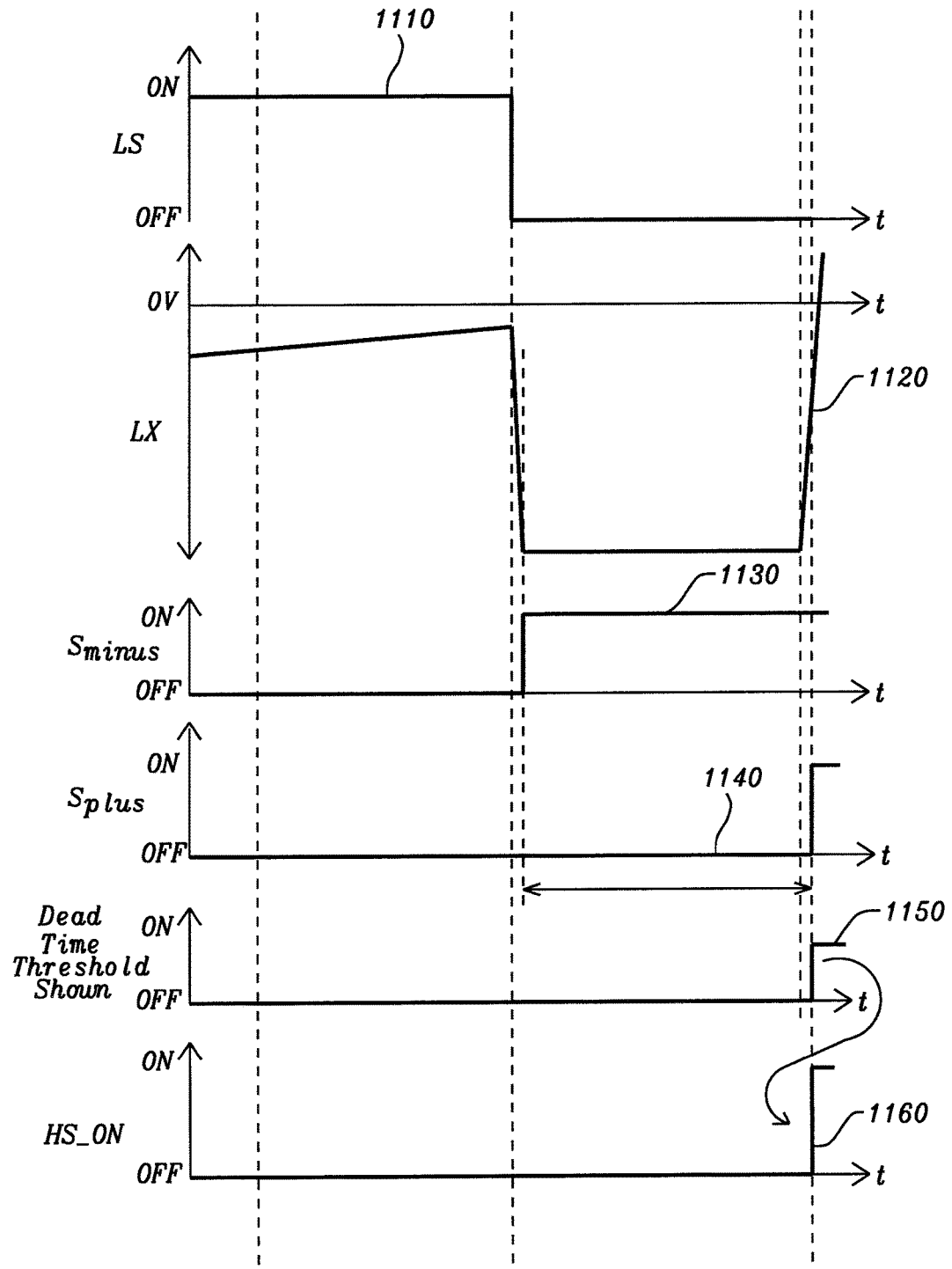

FIG. 11 illustrates how slope detection and subsequent time-to-digital conversion interact with this scheme. Graph 1100 indicates the low-side switch control signal LS for the low-side transistor switch (second transistor switch) 20 and graph 1120 indicates the sensed voltage (e.g., the voltage at the intermediate node 30). Again, the LS signal is the signal that comes directly from an external controller, for example the buck modulator. The LS signal is the request to turn OFF the low-side transistor switch (second transistor switch) 20 and then turn ON the high-side transistor switch (first transistor switch) 10. After that the slope detector circuit 60 and the time-to-digital conversion circuit 70 measure the dead time. The time-to-digital conversion circuit 70 generates in the end a digital, for example thermometric, code proportional to the dead time, for example with a resolution given by the single inverter delay. Graphs 1130 and 1140 indicate the second and first intermediate signals, Sminus, Splus, respectively, that are used for measuring the dead time. Graph 1150 indicates a dead time threshold for comparison to the measured dead time and for generating the high-side switch control signal for the high-side transistor switch (first transistor switch) 10 indicated by graph 1160 on the basis of the comparison. A degree of flexibility is can be realized by choosing the dead time threshold. The longer the dead time, the larger the reverse recovery charge QRR.

Figure 12:
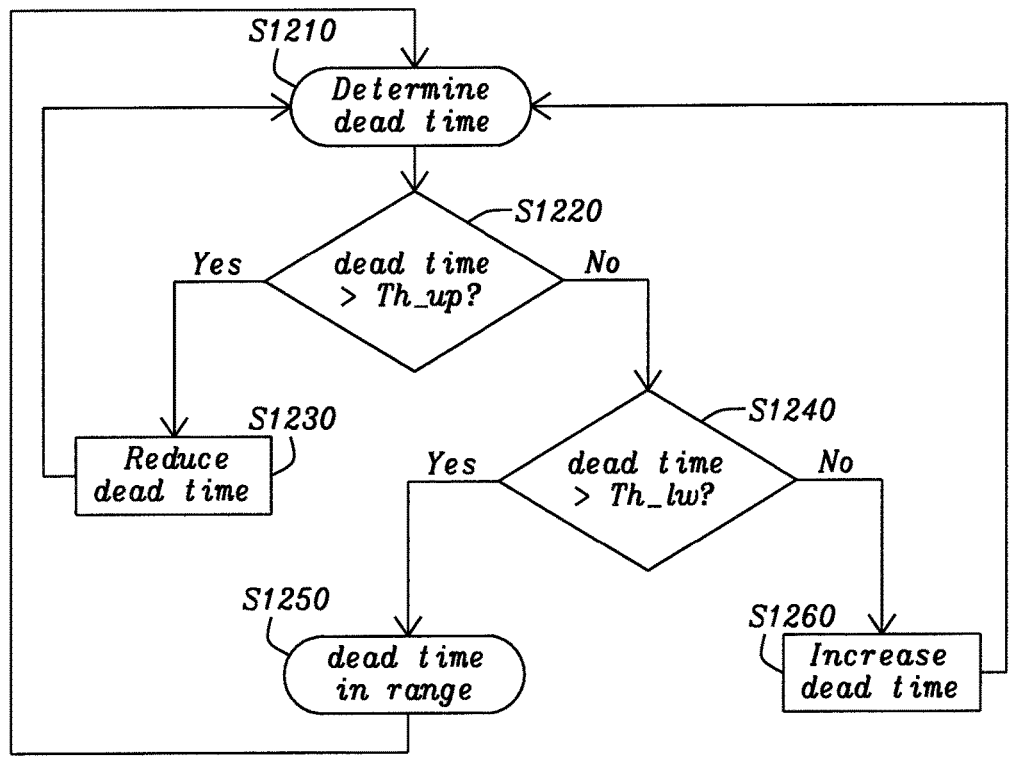

The information output by the time-to-digital conversion circuit 70 (e.g., the switching control signal) is fed to the control circuit 40. The control circuit 40 may compare the measured dead time to a threshold for the dead time. A flow chart for dead time optimization in the switching mode power converter circuit 200 is schematically illustrated in FIG. 12. Basically, the algorithm is always on and the process is performed on a cycle-by-cycle basis, so that the dead time adjustment happens in real time. If the following relationship is satisfied, the dead time is judged to be within an acceptable range (long enough so as to avoid shoot through currents, short enough so as to minimize the reverse recovery charge QRR):

Th_lw<dead time<Th_up.

Therein, Th_lw and Th_up are the lower and upper thresholds, respectively, for the dead time that represent a window into which the measured dead time should fall.

In step S1210, the dead time may be determined (e.g., measured), in the manner described above. At step S1220, the determined dead time may be compared to the upper threshold Th_up for the dead time. If the determined dead time exceeds the upper threshold Th_up (Yes at step S1220), the method may proceed to step S1230. Otherwise (No at step S1220), the method may proceed to step S1240. At step S1230, the dead time may be reduced, for example by a predetermined amount of time (predetermined time unit, predetermined decrement). This may be done for example by advancing the timing at which the high-side transistor switch (first transistor switch) 10 is activated. In other words, the delay between switching OFF the low-side transistor switch 20 and activating the high-side transistor switch 10 may be reduced. Subsequently, the method may return to step S1210 for continuous operation. At step S1240, it may be checked whether the determined dead time exceeds the lower threshold Th_lw for the dead time. If the determined dead time exceeds the lower threshold Th_lw (Yes at step S1240), the dead time may be judged to be within the acceptable range and the method may proceed to step S1210 for continuous operation. Otherwise (No at step S1240), the method may proceed to step S1260 at which the dead time may be increased, for example by a predetermined amount of time (predetermined time unit, predetermined increment). This may be done for example by delaying the timing at which the high-side transistor switch (first transistor switch) 10 is activated. In other words, the delay between switching OFF the low-side transistor switch 20 and activating the high-side transistor switch 10 may be increased. Subsequently, the method may return to step S1210 for continuous operation.

Notably, unless steps require certain steps as prerequisites, the aforementioned steps may be performed in any order and the exemplary order illustrated in FIG. 12 is understood to be non-limiting. For example, in the course of judging whether the determined dead time falls into the acceptable range, it may first be checked whether the determined dead time exceeds the lower threshold Th_lw before checking whether the determined dead time exceeds the upper threshold TH_up, with evident adaptations.

Notably, the above discussion applies to the second dead time (low-side transistor switch 20 OFF and high-side transistor switch 10 going to turn ON), with evident adaptations for the case of the first dead time.

Figure 13:
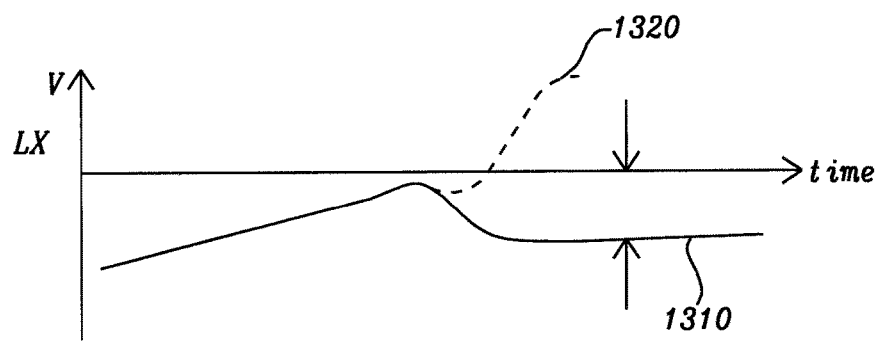

FIG. 13 schematically illustrates an example of a voltage waveform of the voltage at the intermediate node 30 in a conventional switching mode power converter circuit and in the switching mode power converter circuit 200 according to embodiments of the disclosure. Graph 1310 indicates the voltage waveform in the conventional circuit, whereas graph 1320 indicates the voltage waveform for optimized dead time according to embodiments of the disclosure.

It should be noted that the apparatus features described above correspond to respective method features that may however not be explicitly described, for reasons of conciseness. The disclosure of the present document is considered to extend also to such method features. In particular, the present disclosure is understood to relate to methods of operating the circuits described above.

It should further be noted that the description and drawings merely illustrate the principles of the proposed apparatus. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method. Furthermore, all statements herein providing principles, aspects, and embodiments of the invention, as well as specific examples thereof, are intended to encompass equivalents thereof.

What is claimed is:

1. A switching mode power converter circuit, comprising:
   a first transistor switch and a second transistor switch coupled in series between an input voltage level and ground;
   a control circuit for controlling switching operation of the first transistor switch and the second transistor switch; and
   a detection circuit for sensing a voltage at an intermediate node arranged between the first transistor switch and the second transistor switch, for deriving an indication of a slope of the sensed voltage, and for generating a switching control signal for the control circuit on the basis of the derived indication of the slope of the sensed voltage,
   wherein the control circuit is configured to set a first timing for activating the first transistor switch and/or a second timing for activating the second transistor switch on the basis of the switching control signal;
   the detection circuit comprises a slope detector circuit;
   the slope detector circuit is configured to:
      derive the indication of the slope of the sensed voltage; and
      generate one or more intermediate signals indicative of respective timings at which a magnitude of the slope of the sensed voltage exceeds a predetermined threshold; and
   the slope detector circuit comprises:
   a current mirror of two gate-connected transistors; and
   a comparator,
   wherein each transistor of the current mirror is coupled in series with a respective current source;
   a first node between one of the transistors and its respective current source is coupled to a second node between the other one of the transistors and its respective current source via a resistance element;
   the first node is coupled to the intermediate node arranged between the first and second transistor switches;
   the second node is coupled to an input port of the comparator; and
   an output of the comparator serves as one of the one or more intermediate signals.

2. The switching mode power converter circuit according to claim 1, wherein the switching control signal is indicative of a dead time of the switching mode power converter circuit.

3. The switching mode power converter circuit according to claim 1, wherein the slope detector circuit is configured to:
generate a first intermediate signal indicative of respective timings at which the slope of the sensed voltage exceeds a predetermined positive threshold; and
generate a second intermediate signal indicative of respective timings at which the slope of the sensed voltage drops below a predetermined negative threshold.

4. The switching mode power converter circuit according to claim 1, wherein the detection circuit is at least partially disabled for at least a portion of the period of time during which either one of the first transistor switch or the second transistor switch is activated.

5. The switching mode power converter circuit according to claim 2, wherein the control circuit is configured to set the first timing and/or the second timing on the basis of the switching control signal in such a manner that the dead time of the switching mode power converter circuit is reduced.

6. A switching mode power converter circuit, comprising:
a first transistor switch and a second transistor switch coupled in series between an input voltage level and ground;
a control circuit for controlling switching operation of the first transistor switch and the second transistor switch; and
a detection circuit for sensing a voltage at an intermediate node arranged between the first transistor switch and the second transistor switch, for deriving an indication of a slope of the sensed voltage, and for generating a switching control signal for the control circuit on the basis of the derived indication of the slope of the sensed voltage,
wherein the control circuit is configured to set a first timing for activating the first transistor switch and/or a second timing for activating the second transistor switch on the basis of the switching control signal;
the detection circuit comprises a slope detector circuit;
the slope detector circuit is configured to:
derive the indication of the slope of the sensed voltage; and
generate one or more intermediate signals indicative of respective timings at which a magnitude of the slope of the sensed voltage exceeds a predetermined threshold;
the detection circuit comprises a time-to-digital conversion circuit; and
the time-to-digital conversion circuit is configured to generate, as the switching control signal, a digital signal indicative of a dead time of the switching mode power converter circuit on the basis of the one or more intermediate signals; and
the time-to-digital conversion circuit comprises:
a delay line comprising a plurality of inverters; and
a shift register,
wherein the shift register is clocked by one of the one or more intermediate signals;
another one of the one or more intermediate signals is fed to the delay line; and
for each inverter among the plurality of inverters, an output of the respective inverter is fed to a respective corresponding stage of the shift register.

7. The switching mode power converter circuit according to claim 6, wherein the switching control signal is indicative of a dead time of the switching mode power converter circuit.

8. The switching mode power converter circuit according to claim 6, wherein the slope detector circuit is configured to:
generate a first intermediate signal indicative of respective timings at which the slope of the sensed voltage exceeds a predetermined positive threshold; and
generate a second intermediate signal indicative of respective timings at which the slope of the sensed voltage drops below a predetermined negative threshold.

9. The switching mode power converter circuit according to claim 6, wherein the detection circuit is at least partially disabled for at least a portion of the period of time during which either one of the first transistor switch or the second transistor switch is activated.

10. The switching mode power converter circuit according to claim 7, wherein the control circuit is configured to set the first timing and/or the second timing on the basis of the switching control signal in such a manner that the dead time of the switching mode power converter circuit is reduced.

11. A method of operating a switching mode power converter circuit having a first transistor switch and a second transistor switch coupled in series between an input voltage level and ground, the method comprising:
sensing a voltage at an intermediate node arranged between the first transistor switch and the second transistor switch;
deriving an indication of a slope of the sensed voltage;
generating a switching control signal on the basis of the derived indication of the slope of the sensed voltage;
controlling switching operation of the first transistor switch and the second transistor switch in accordance with the switching control signal; and
generating one or more intermediate signals indicative of respective timings at which a magnitude of the slope of the sensed voltage exceeds a predetermined threshold; and
generating, as the switching control signal, a digital signal indicative of a dead time of the switching mode power converter circuit on the basis of the one or more intermediate signals,
wherein said controlling involves setting a first timing for activating the first transistor switch and/or a second timing for activating the second transistor switch on the basis of the switching control signal; and
generating the digital signal involves:
clocking a shift register by one of the one or more intermediate signals;
feeding another one of the one or more intermediate signals to a delay line comprising a plurality of inverters; and
for each inverter among the plurality of inverters, feeding an output of the respective inverter to a respective corresponding stage of the shift register.

12. The method according to claim 11, wherein the switching control signal is indicative of a dead time of the switching mode power converter circuit.

13. The method according to claim 11, wherein generating the one or more intermediate signals involves:
generating a first intermediate signal indicative of respective timings at which the slope of the sensed voltage exceeds a predetermined positive threshold; and generating a second intermediate signal indicative of respective timings at which the slope of the sensed voltage drops below a predetermined negative threshold.

14. The method according to claim 11, wherein generating the one or more intermediate signals involves:
   generating a voltage pulse indicative of a magnitude of the slope of the sensed voltage; and
   comparing a magnitude the voltage pulse to a threshold voltage.

15. The method according to claim 11, further comprising:
   disabling sensing the voltage at the intermediate node for at least a portion of the period of time during which either one of the first transistor switch or the second transistor switch is activated.

16. The method according to claim 12, wherein said controlling involves setting the first timing and/or the second timing on the basis of the switching control signal in such a manner that the dead time of the switching mode power converter circuit is reduced.

17. A method of operating a switching mode power converter circuit having a first transistor switch and a second transistor switch coupled in series between an input voltage level and ground, the method comprising:
   sensing a voltage at an intermediate node arranged between the first transistor switch and the second transistor switch;
   deriving an indication of a slope of the sensed voltage;
   generating a switching control signal on the basis of the derived indication of the slope of the sensed voltage;
   controlling switching operation of the first transistor switch and the second transistor switch in accordance with the switching control signal;
   generating one or more intermediate signals indicative of respective timings at which a magnitude of the slope of the sensed voltage exceeds a predetermined threshold;
   providing a current mirror of two gate-connected transistors and a comparator;
   coupling each transistor of the current mirror in series with a respective current source;
   coupling a first node between one of the transistors and its respective current source to a second node between the other one of the transistors and its respective current source via a resistance element;
   coupling the first node to the intermediate node arranged between the first and second transistor switches;
   coupling the second node an input port of the comparator; and
   generating an output of the comparator as one of the one or more intermediate signals.

18. The method according to claim 17, wherein the switching control signal is indicative of a dead time of the switching mode power converter circuit.

19. The method according to claim 17, wherein generating the one or more intermediate signals involves:
   generating a first intermediate signal indicative of respective timings at which the slope of the sensed voltage exceeds a predetermined positive threshold; and
   generating a second intermediate signal indicative of respective timings at which the slope of the sensed voltage drops below a predetermined negative threshold.

20. The method according to claim 17, wherein generating the one or more intermediate signals involves:
   generating a voltage pulse indicative of a magnitude of the slope of the sensed voltage; and
   comparing a magnitude the voltage pulse to a threshold voltage.

21. The method according to claim 17, further comprising:
   disabling sensing the voltage at the intermediate node for at least a portion of the period of time during which either one of the first transistor switch or the second transistor switch is activated.

22. The method according to claim 18, wherein said controlling involves setting the first timing and/or the second timing on the basis of the switching control signal in such a manner that the dead time of the switching mode power converter circuit is reduced.

* * * * *